United States Patent
Seitz et al.

(10) Patent No.: US 9,087,405 B2
(45) Date of Patent: Jul. 21, 2015

(54) DEPTH MAP GENERATION USING BOKEH DETECTION

(71) Applicant: Google Inc., Mountain View, CA (US)

(72) Inventors: Steven Maxwell Seitz, Seattle, WA (US); Carlos Hernandez Esteban, Kirkland, WA (US); Supasorn Suwajanakorn, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/107,163

(22) Filed: Dec. 16, 2013

(65) Prior Publication Data

US 2015/0170400 A1     Jun. 18, 2015

(51) Int. Cl.
*G06T 15/10* (2011.01)
*G06T 15/08* (2011.01)

(52) U.S. Cl.
CPC ...................... *G06T 15/08* (2013.01)

(58) Field of Classification Search
CPC ......... G06T 15/20; G06T 19/00; G06T 15/10; G06T 17/00; G06F 3/04815
See application file for complete search history.

(56) References Cited

U.S. PATENT DOCUMENTS

| | | | | |
|---|---|---|---|---|
| 2007/0258707 | A1* | 11/2007 | Raskar | 396/52 |
| 2009/0116732 | A1* | 5/2009 | Zhou et al. | 382/154 |
| 2009/0154823 | A1* | 6/2009 | Ben-Ezra et al. | 382/255 |
| 2012/0133746 | A1* | 5/2012 | Bigioi et al. | 348/50 |
| 2013/0010067 | A1* | 1/2013 | Veeraraghavan et al. | 348/46 |
| 2013/0044227 | A1* | 2/2013 | Uehara | 348/208.1 |
| 2013/0125000 | A1* | 5/2013 | Fleischhauer et al. | 715/723 |

FOREIGN PATENT DOCUMENTS

WO     2009016256 A1     2/2009

OTHER PUBLICATIONS

Baheti, et al., "3D Scene Recovery from Defocused Video Sequence", International Journal of Advanced Research in Computer and Communication Engineering, vol. 1, Issue 3, May 2012, ISSN: 2278-1021.
Brox, et al., "High Accuracy Optical Flow Estimation Based on a Theory for Warping", vol. 4, pp. 25-36, May 2004.
Bruhn, et al., "Lucas/Kanade Meets Horn/Schunk: Combining Local and Global Optic Flow Methods", International Journal of Computer Vision, 61(3), pp. 211-231, 2005.
Cave, "Depth from Defocus", Projects, Oct. 8, 2013.

(Continued)

*Primary Examiner* — Peter Hoang
(74) *Attorney, Agent, or Firm* — Lerner, David, Littenberg, Krumholz & Mentlik, LLP

(57) ABSTRACT

In one aspect, one or more computing devices receive a set of image frames. Each image frame includes pixels. The computing devices align image frames in order to identify flows of the pixels in the set of image frames. Regions of bokeh effect are identified in each image frame by measuring the sizes of areas of expansion across image frames using a set of assumptions and the identified flows. The computing devices adjust the alignment of the set of image frames based at least in part on the identified regions of bokeh effect. For each image frame, the computing devices generates an index map of focus values for each of the pixels that image frame using the improved alignment. A depth map is generated by the computing devices based at least in part on the index maps.

19 Claims, 20 Drawing Sheets

(56) References Cited

OTHER PUBLICATIONS

Jacobs, et al., "Focal Stack Compositing for Depth of Field Control", Stanford Computer Graphics Laboratory Technical Report 2012-1, pp. 1-11.
Kriener, et al., "Accelerating defocus blur magnification", Google Inc., Mar. 18, 2013, pp. 1-11.
Liu, "Beyond Pixels: Exploring New Representations and Applications for Motion Analysis", Jun. 2009, pp. 1-164.
Liu, "Optical Flow Matlad/C++ Code", Updated Aug. 1, 2011.
Nayar, et al., "Real-Time Focus Range Sensor", Copyright 1995, pp. 995-1001.
Shroff, N., et al., "Variable Focus Video: Reconstructing Depth and Video for Dynamic Scenes", Mitsubishi Research Laboratories, Apr. 2012.
Sundaram, et al., "Are Textureless Scenes Recoverable?", Copyright 1997, pp. 814-820.
Watanabe, et al., "Minimal Operator Set for Passive Depth from Defocus", Copyright 1996, pp. 431-438.
Watanabe, et al., "Rational Filters for Passive Depth from Defocus", International Journal of Computer Vision, 27 (3), pp. 203-225, 1998.
Watanabe, et al., "Real-time computation of depth from defous", 1996.
Watanabe, et al., "Telecentric Optics for Computational Vision", 1996.
Watanabe, et al., "Telecentric Optics for Constant-Magnification Imaging", Sep. 1995.
Watanabe, et al., "Telecentric Optics for Focus Analysis", Short Papers, IEEE Transactions on Pattern Analysis and Machine Intelligence, vol. 19, No. 12, Dec. 1997, pp. 1360-1365.
Wikipedia, "Horn-Schunck method", Wikipedia, the free encyclopedia, Last modified Jan. 15, 2014.
Wikipedia, "Sobel operator", Wikipedia, the free encyclopedia, Last modified Feb. 17, 2014.

* cited by examiner

DEPTH MAP GENERATION USING BOKEH DETECTION

BACKGROUND

Various systems allow users to generate depth maps or 3-dimensional (3D) representations of structures using image frames of videos or still images. Typically, such systems require an immense amount of computing power, large numbers of images captured from different locations, or images captured under special conditions in a laboratory. However, these systems are generally unable to create depth maps from still images or images which have very little differences between them.

SUMMARY

Aspects of the disclosure provide a method for generating depth maps. The method includes receiving, by one or more computing devices, a set of image frames, each image frame of the set of image frames including pixels; aligning, by the one or more computing devices, the set of image frames to provide flows of the pixels in the set of image frames; identifying, by the one or more computing devices, any region of bokeh effect in each image frame of the set of image frames by measuring sizes of areas of expansion across image frames of the set of image frames using a set of assumptions and the flows; adjusting, by the one or more computing devices, the alignment of the set of image frames based at least in part on the identified regions of bokeh effect; generating, by the one or more computing devices, for each particular image frame of the set of image frames an index map of focus values for the pixels of that particular image frame using the improved alignment; and generating, by the one or more computing devices, a depth map based at least in part on the index maps.

In one example, the method also includes capturing the set of image frames. In another example, aligning the set of image frames further includes using a flow concatenation process that determines optical flow between consecutive images. In this example, the flow concatenation process further produces new flows that warp each image frame of the set of image frames to a reference frame, and wherein the new flows are used to identify the regions of bokeh effect. In another example, identifying the regions of bokeh effect includes using a voting scheme that provides for each pixel in a first image frame of the set of image frames to vote for a corresponding pixel in each of the other image frames of the set of image frames. In another example, the set of assumptions includes an assumption that a given region of bokeh effect has a high color intensity relative to other regions without bokeh effect. In another example, the set of assumptions include an assumption that contour expansion due to a bokeh effect has consistent movements. In another example, the method also includes generating a composite image of focused pixels from the set of image frames based at least in part on the index map, wherein the composite image is used to generate the depth map.

Another aspect of the disclosure provides a system for generating depth maps. The system includes one or more computing devices. The one or more computing devices are configured to receive a set of image frames, each image frame of the set of image frames including pixels; align the set of image frames to provide flows of the pixels in the set of image frames; identify any region of bokeh effect in each image frame of the set of image frames by measuring sizes of areas of expansion across image frames of the set of image frames using a set of assumptions and the flows; adjust the alignment of the set of image frames based at least in part on the identified regions of bokeh effect; generate, for each particular image frame of the set of image frames an index map of focus values for the pixels of that particular image frame using the improved alignment; and generate a depth map based at least in part on the index maps.

In one example, the one or more computing devices are also configured to capture the set of image frames. In another example, the one or more computing devices are also configured to align using a flow concatenation process that determines optical flow between consecutive images. In this example, the one or more computing devices are also configured to produces new flows that warp each image frame of the set of image frames to a reference frame and the one or more computing devices are also configured to use the new flows to identify the bokeh regions. In another example, the one or more computing devices are also configured to identify the regions of bokeh effect by using a voting scheme that provides for each pixel in a first image frame of the set of image frames to vote for a corresponding pixel in each of the other image frames of the set of image frames. In another example, the one or more computing devices are also configured to generate a composite image of focused pixels from the set of image frames based at least in part on the index map and to use the composite image to generate the depth map.

A further aspect of the disclosure provides a non-transitory, tangible computer-readable recording medium storing instructions. The instructions, when executed by one or more processors, cause the one or more processors to perform a method for generating depth maps. The method includes receiving a set of image frames, each image frame of the set of image frames including pixels; aligning the set of image frames to provide flows of the pixels in the set of image frames; identifying any region of bokeh effect in each image frame of the set of image frames by measuring sizes of areas of expansion across image frames of the set of image frames using a set of assumptions and the flows; adjusting the alignment of the set of image frames based at least in part on the identified regions of bokeh effect; generating for each particular image frame of the set of image frames an index map of focus values for the pixels of that particular image frame using the improved alignment; and generating a depth map based at least in part on the index maps.

In one example, the method also includes capturing the set of image frames. In one example, the method also includes aligning the set of image frames by using a flow concatenation process that determines optical flows between consecutive images. In this example, the flow concatenation process further produces new flows that warp each of the image frames of the set of image frames to a reference frame and the method further includes using the new flows to identify the regions of bokeh effect. In one example, the method also the method further comprises identifying the regions of bokeh effect by using a voting scheme that provides for each pixel in a first image frame of the set of image frames to vote for a corresponding pixel in each of the other image frames of the set of image frames. In one example, the method also includes generating a composite image of focused pixels from the set of image frames based at least in part on the index map, and the composite image is used to generate the depth map.

DETAILED DESCRIPTION

Overview

Figure 1:
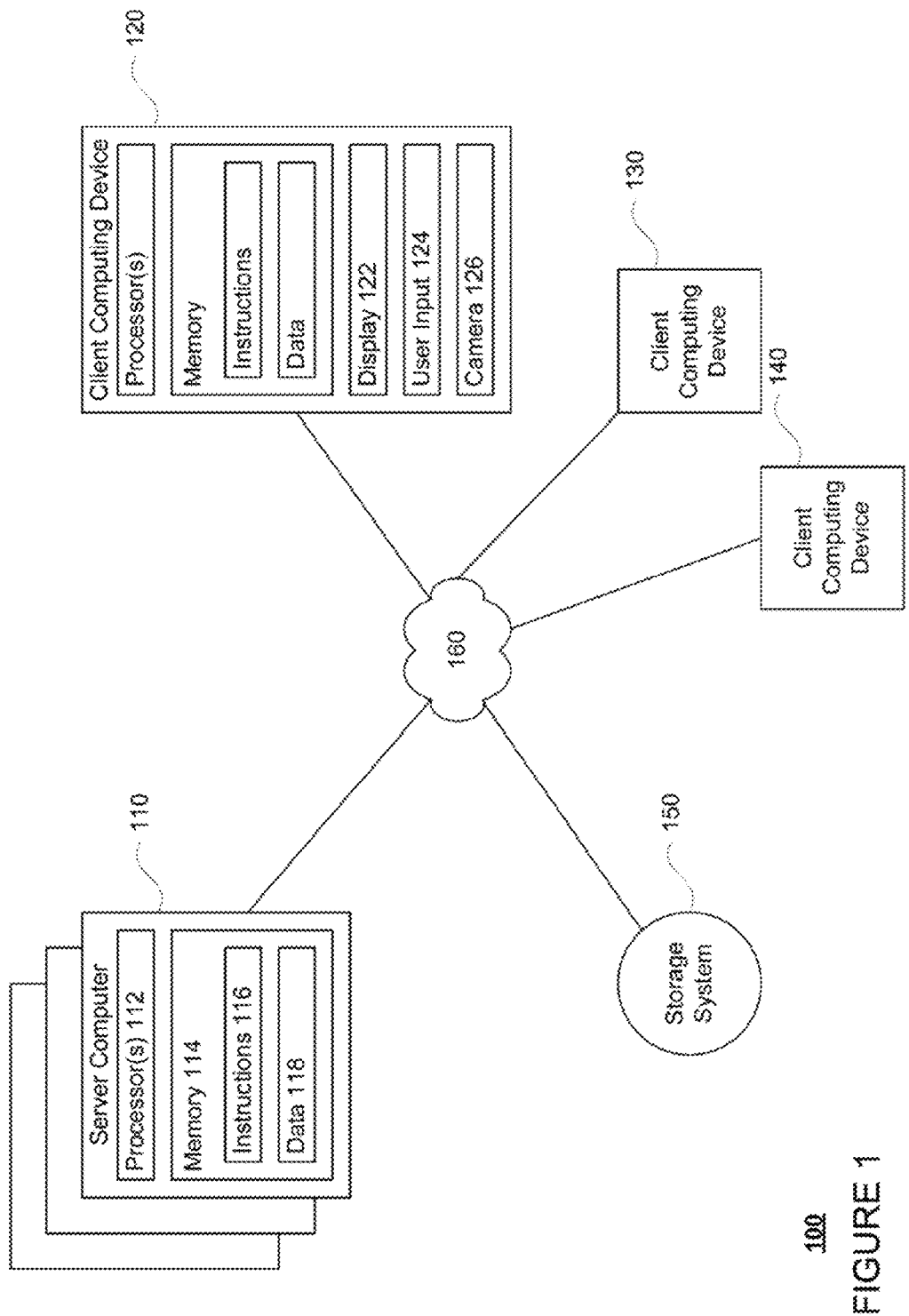
FIG. 1 is a functional diagram of an example system in accordance with aspects of the disclosure.

The technology pertains to generating a depth map of a scene from a set of image frames. This may involve generating an "all-in-focus" artificial image by aligning the images using optical flow while also accounting for contour movements in high contrast regions or bokehs. As an example, a bokeh effect or bokeh region may refer to a sharp disc-shaped circular expansion or any contour movement in high-contrast regions not limited to a circular shape. For example, a user of a client computing device, such as a cellular phone, may capture a series of image frames using a video or still image camera setting. At least some of these images may be captured using different camera settings such as focal depth and aperture size. In this regard, the image frames may be captures of slightly different views having varying magnification or parallax. Despite having a plurality of unknown variables such as focal length, aperture size, pose, or scene details, the client computing device, or some other computing device, may process these image frames to create an all-in-focus image, or a composite image with more than one depth in focus. By doing so, the client computing device may also generate a depth map of the scene of that composite image.

In one scenario, a client computing device may first capture a set of image frames, or a photo stack. Any two image frames may have different parallax, scaling, and defocus characteristics. For example, in each of these image frames, the focal plane as well as the camera may move. Because of this, the image frames may need to be aligned to one another.

A flow concatenation process which determines optical flows between consecutive image frames in the series of images may be used to align the images. This may avoid large defocus changes while at the same time identifying the flow of each pixel of each image frame into an associated pixel of each other image frame (if one exists). The flows may then be combined to produce new flows that warp every image frame to a reference frame. As an example, this reference frame may be the first image frame in the set or some other image frame.

To account for the effect of bokeh expansion in the optical flow, bokehs must be identified or differentiated from the effects of parallax. Various assumptions may be used in order to identify bokeh regions. Example assumptions may include that bokeh regions generally have high color intensity. In addition, contour expansion of bokeh regions will have consistent movements through frames in the focal stack. For example, the expansion can either be outwardly only, inwardly only, or inward then outward, whereas movement due to parallax may appear more random.

Bokehs may then be detected by measuring the size of area expansion across the series of image frames. For example, a region of bright pixels that is initially small in one frame and constantly expands (or contracts) in other frames will correspond to a source of bokeh expansion.

In order to approximate how much each pixel in each image frame expands, a voting scheme may be used. In this regard, every pixel may vote for other corresponding pixels in other image frames. Pixels with high vote counts will correspond to the source of expansion because they will receive votes from larger corresponding regions from all other frames. The maximum votes are then propagated back to the corresponding pixels and a bokeh confidence map may be generated for each frame.

The detected bokeh regions may then be used to guide where the flows should appear smooth. As an example, the bokeh regions can be incorporated into the computed flows by locally increasing the regularization in neighboring pixels of the bokeh regions. This provides an improved alignment of the images.

Once the image frames are aligned a pixel map may be created by using an operator that looks for gradients, edges, etc. The result is an index map of each pixel's focus value. The colors associated with the pixels with the highest focus values may then be used to generate the all in focus image.

The focal distance for each image frame and a depth map may be determined or generated using the aligned image frames as well as the all in focus image. This may be achieved by using a non linear optimization approach described below that simultaneously solves for both the focal distance and the depth map. For example, the pixels in an all-in-focus image may be blurred to simulate moving the focal plane. The blurred pixels may be compared to the pixels of each image frame to generate an estimate of the blur at each pixel and the location of the focal plane in that image frame. The result is the focal distance setting of the camera for each image frame as well as the depth of the pixels of each image.

Example Systems

Figure 2:
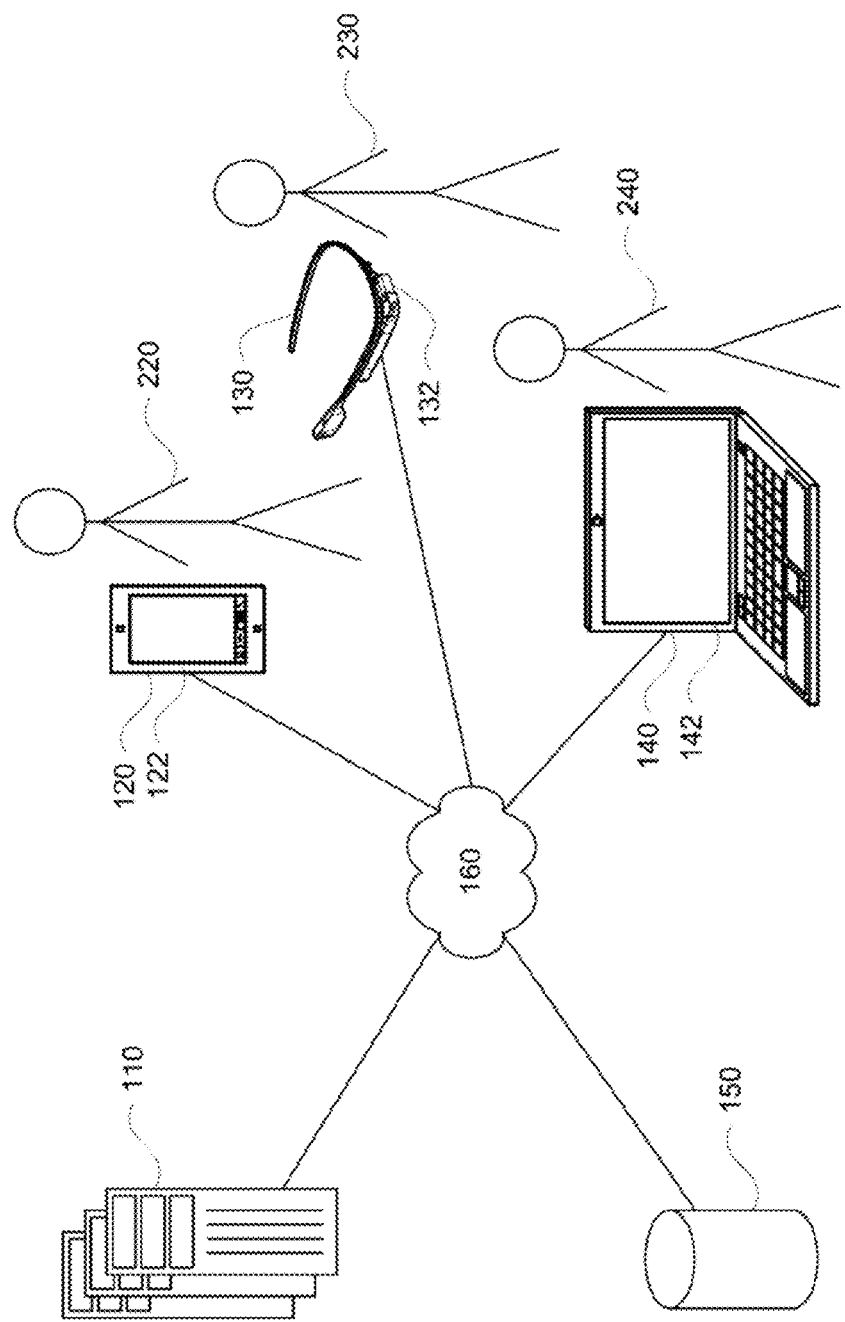
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 can include computing devices 110, 120, 130, and 140 as well as storage system 150. Computing device 110 can contain one or more processors 112, memory 114 and other components typically present in general purpose computing devices. Memory 114 of computing device 110 can store information accessible by processor 112, including instructions 116 that can be executed by the processor 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can include any conventional processors, such as a commercially available CPU. Alternatively, the processor can be a dedicated component such as an ASIC or other hardware-based processor. Although not necessary, computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in a housing different from that of computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm. Yet further, although some functions described below are indicated as taking place on a single computing device having a single processor, various aspects of the subject matter described herein can be implemented by a plurality of computing devices, for example, communicating information over network 160.

The computing devices 110 can be at various nodes of a network 160 and capable of directly and indirectly communicating with other nodes of network 160. Although only a few computing devices are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, computing devices 110 may include one or more web servers that are capable of communicating with storage system 150 as well as computing devices 120, 130, and 140 via the network. For example, server computing devices 110 may use network 160 to transmit and present information to a user, such as user 220, 250, or 250, on a display, such as displays 122, 132, or 142 of computing devices 120, 130, or 140. In this regard, computing devices 120, 130, and 140 may be considered client computing devices and may perform all or some of the features described below.

Each of the client computing devices may be configured similarly to the server computing devices 110, with one or more processors, memory and instructions as described above. Each client computing device 120, 130 or 140 may be a personal computing device intended for use by a user 220, 250, 250, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 125 (e.g., a mouse, keyboard, touch-screen or microphone). The client computing device may also include a camera for recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

Storage system 150 may store user account information. The user account information may include login information such as a username or email and password combination as well as other information provided by a user. As an example, this information may include various image frames uploaded by a user. The storage system may also store depth map and camera attributes associated with these image frames as described in more detail below.

As with memory 114, storage system 150 can be of any type of computerized storage capable of storing information accessible by server 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to or incorporated into any of the computing devices 110-140 (not shown).

Example Methods

Figure 3:
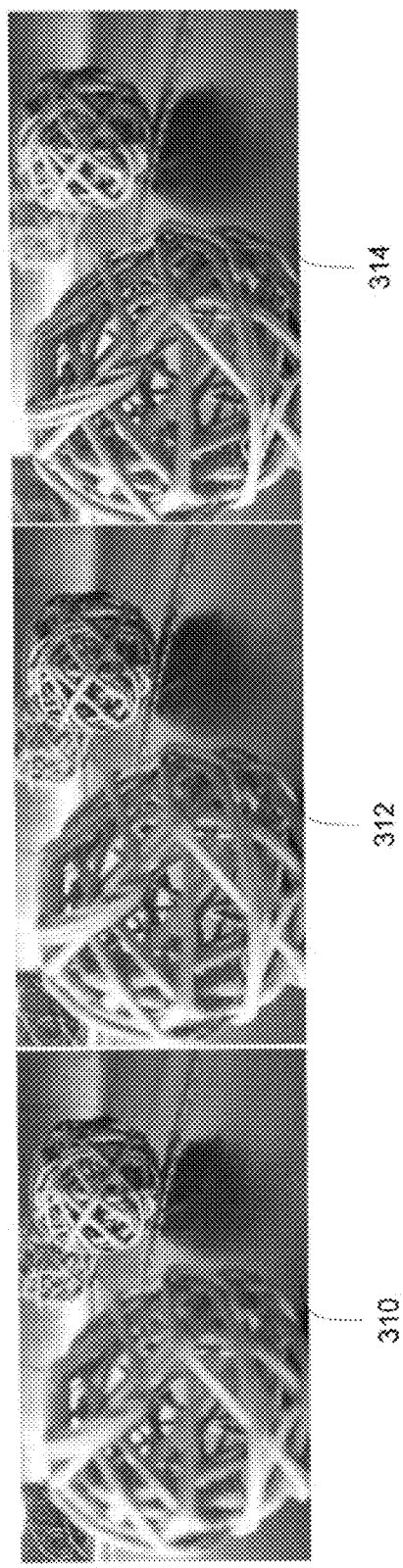
FIG. 3 is an example set of image frames in accordance with aspects of the disclosure.

As noted above, a user of a computing device, such as user 230 of client device 130, may capture a series of image frames using a video or still image camera setting. FIG. 3 is an example set of image frames. In this example, image frames 310, 312, and 314 may have been taken in sequence or in the order of image frame 310, then image frame 312, and finally image frame 314. While only three image frames are depicted, a set of image frames may include any number of image frames, such as 5, 10, 50, 100 or more.

At least some of the images of the set of images may be captured using different camera settings such as focal depth and aperture size. In addition, between each of these image frames, the focal plane as well as the camera may move and/or the magnification value may change. Because of this, the image frames may need to be aligned to one another.

The set of image frames may be aligned using an optical flow process. While any number of different optical flow processes may be used, it should allow spatially-varying regularization cost. The optical flow process described by C. Liu in "Beyond Pixels: Exploring New Representations and Applications for Motion Analysis," Doctoral Thesis. Massachusetts Institute of Technology, May 2009, is one such example. In general, however, locally increasing the regularization is one of many ways of guiding the flows. Some flow interpolation methods also work reasonably well and do not require spatially-varying regularized optical flow and any standard processes with acceptable performance may be used.

The optical flow process aligns each of the image frames of the set to a reference image and also provides the flows of pixels between these images. As an example, this reference image frame may be the first image frame in the set, the image frame having the closest focal depth, or some other image frame.

Figure 4A:
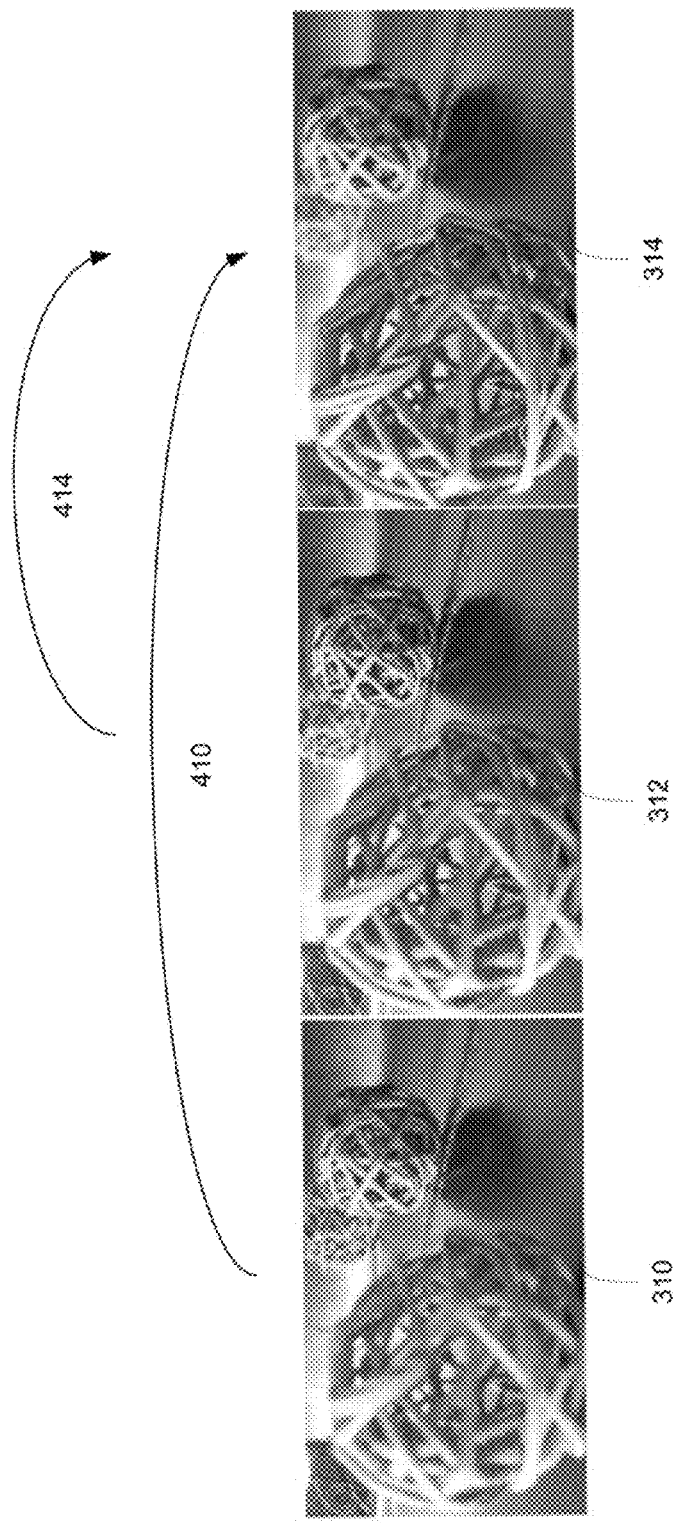
FIGS. 4A and 4B are examples of optical flow processing approaches in accordance with aspects of the disclosure.

In one example, the set of image frames may be aligned by determining optical flows directly between each frame to the reference. For example, as shown in FIG. 4A, assuming that image frames 310, 312, and 314 are a set of consecutive image frames and that image frame 314 is the reference frame, image frame 310 may be aligned directly to image frame 314 directly along line 410, and image frame 312 may be aligned to image frame 314 directly along line 414. However, such an approach would not explain or exclude the movement due to defocus change. In other words, it would not be invariant to defocus.

For example, the optical flow technique described above with certain regularization, can reasonably handle the local parallax due to camera's or scene motion, the global similarity transformation due to magnification change, and affine transformation due to a rolling shutter effect, if two frames have similar defocus (e.g., are consecutive in the focal stack), and also be invariant to small defocus in low-contrast regions. However, in the high-contrast regions, defocus can perceptually move image contours towards the direction of darker region. In the case where the lighter region involves a point light source, defocus can cause what is referred to herein as bokeh. As noted above, a bokeh region or bokeh effect may thus refer to a sharp disc-shaped circular expansion or any contour movement in high-contrast regions not limited to a circular shape.

Figure 5B:
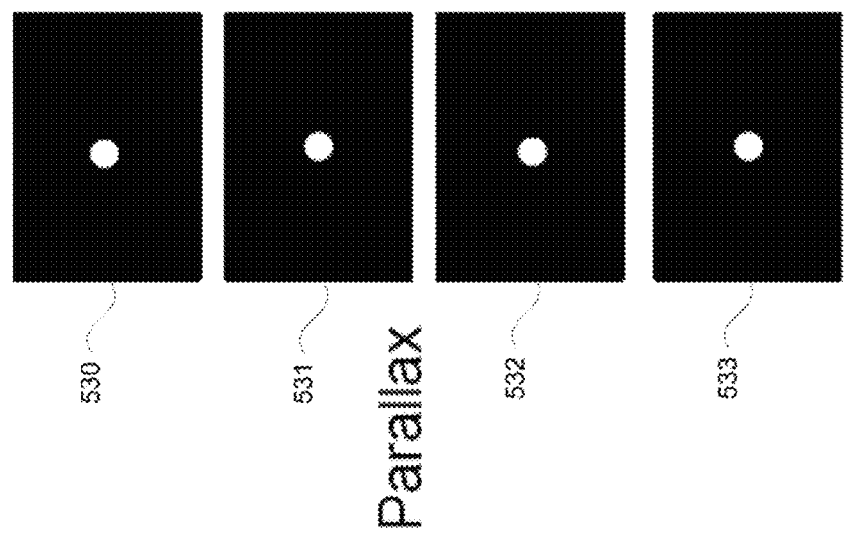
FIGS. 5A and 5B are examples of bokeh effect and parallax effect in accordance with aspects of the disclosure.
Figure 5A:
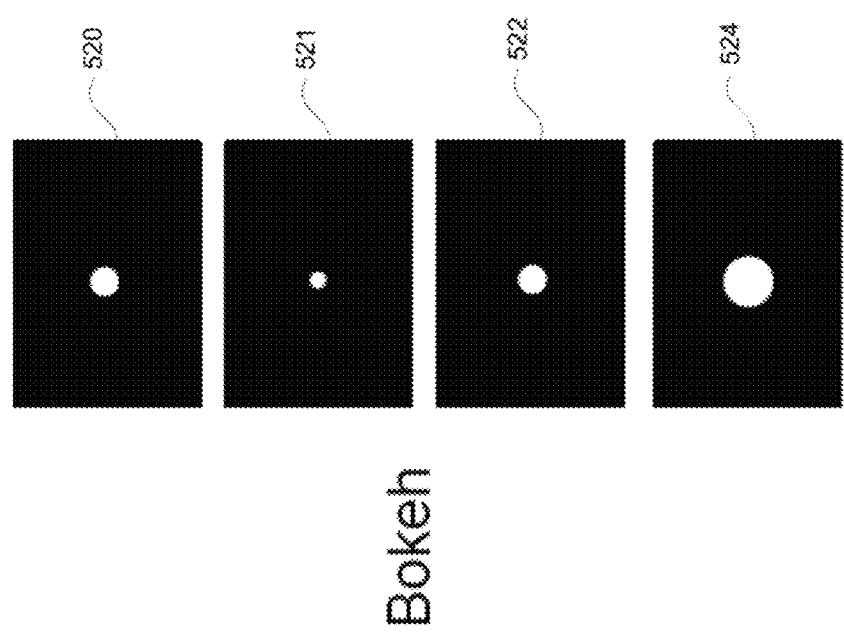

FIGS. 5A and 5B provide an example of regions of bokeh effect as compared to regions of parallax effect. In the example of FIG. 5A, each image frame of the set of image frames 520-524 include a bright or white circle. As the focal distance of the images changes, the white circle initially contracts from image frame 520 to image frame 521 and then expands from images frame 521 to image frames 523 and 524. Thus, FIG. 5A demonstrates a bokeh effect. In the example of FIG. 5B, each image frame of the set of image frames 530-534 also includes a bright or white circle. However, rather than expanding and contracting, the white circle appears to move around the image frames without significant expansion or contraction. Thus, FIG. 5B demonstrates a parallax effect.

In traditional optical flow, regions of bokeh effect will be treated the same as regions of parallax effect. As a result, the sizes and shapes of bokehs in all aligned frames may appear similar to those in the reference frame. Alternatively, increasing the regularization so that the flow no longer captures changes in bokeh regions, the flow may be too smooth and fail to capture parallax and affine change resulting in a bad alignment.

A combination of two techniques may be used to account for bokeh regions: (1) determining optical flows between consecutive image frames in the set of image frames to large defocus change and combining the flows to produce new flows that warp every frame to the reference frame, and (2) using a defocus-invariant optical flow which differentiates bokeh regions from parallax regions and excludes the effect of bokeh expansion in the optical flow.

Figure 4B:
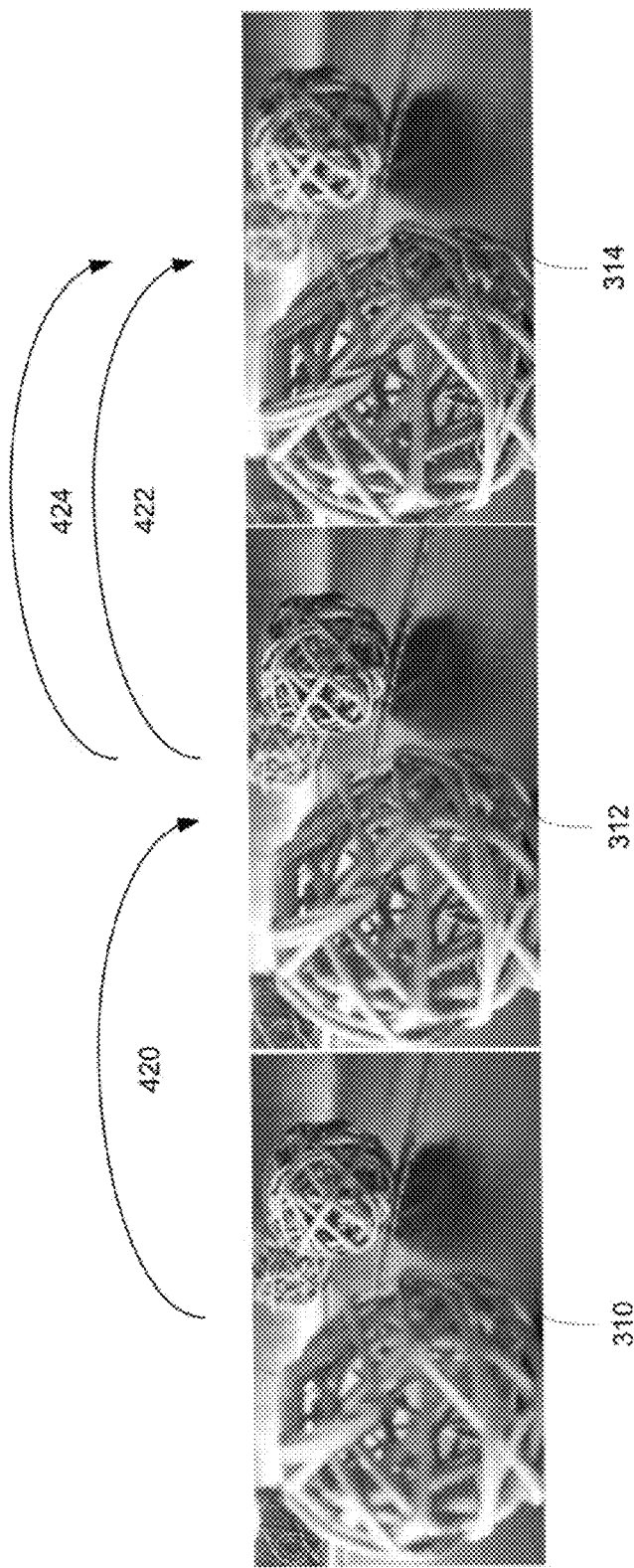

In this regard, a flow concatenation process which determines optical flow between consecutive image frames in the series of images may be used to align the images. For example, as shown in FIG. 4B, again assuming that image frames 310, 312, and 314 are a set of consecutive image frames and that image frame 314 is the reference frame, image frame 312 may be aligned to image frame 314 directly along line 424. However, in order to align image frames 310 to a reference image frame 314, image frame 310 is first aligned to image frame 312 along line 420, and subsequently aligned to image frame 314 along line 422. Accordingly, the flows of pixels of image frame 310 into image frame 314 are determined by first calculating the flows of pixels into image frame 312 and subsequently into image frame 314. As described above, this may avoid errors caused by large defocus changes while at the same time identifying the flow of each pixel of each image frame into an associated pixel of each other image frame (if one exists).

The indirect flows from one image frame to the reference frame may then be combined to produce new flows that warp every image frame to a reference frame. In this regard, the flows along lines 410 and 412 may be combined to provide the flow directly between image frame 310 and image frame 314.

As a further example, to align a set of consecutive image frames $I_1; I_2; \ldots; I_{n-1}$ to a reference frame $I_n$, an optical-flow process may be run $I_{n-1}$ times between each image frame $I_i$ and $I_{i+1}$. The two-dimensional (2D) flow field defined on position (u, v) that warps image frame $I_i$ to image frame $I_{i+1}$ may be denoted by $\mathcal{F}_i^{i+1}(u, v): \mathbb{R}^2 \to \mathbb{R}^2$ where the first $\mathbb{R}^2$ refers to the two arguments of the function $\mathcal{F}_i^{i+1}(u, v)$, u and v, each of which are real numbers $\mathbb{R}$, the second $\mathbb{R}^2$ refers to $\mathcal{F}_i^{i+1}(u, v)_x$ and $\mathcal{F}_i^{i+1}(u, v)_y$ are the x- and y-components of the flow, each of which are also real numbers. For example, $\mathcal{F}_i^{i+1}(2, 8)$ equals (1.5, −4.5), this would mean that the flow at the pixel (2, 8) that warps image 1 to image 2 has an x-component equal to 1.5 and a y-component equal to −4.5. Thus, to generate image 2 from the pixels in image 1 at position (5, 8), the pixel (5+1.5, 8−4.5) or (6.5, 3.5) may be put it at the position of the pixel at (5, 8).

An inverse warping function $\mathcal{W}_\mathcal{F}(I)$ to warp image frame I according to the flow $\mathcal{F}$ is defined as $\mathcal{W}_\mathcal{F}(I(u, v))=I(u+\mathcal{F}(u, v)_x, v+\mathcal{F}(u, v)_y)$. The flow field may be discrete and the inverse warping may be done using bilinear interpolation.

Next, given $\mathcal{F}_1^2, \mathcal{F}_2^3, \ldots, \mathcal{F}_{n-1}^n$, the flow that warps each image frame to the reference may be recursively defined as $\mathcal{F}_i^n = \mathcal{F}_i^{n-1} \circ \mathcal{F}_{n-1}^n$ where ∘ is a concatenation operator given by $\mathcal{F} \circ \mathcal{F}^i = S$ where $S_x = \mathcal{W}_{\mathcal{F}^i}(\mathcal{F}_x)$ and similarly, $S_y = \mathcal{W}_{\mathcal{F}^i}(\mathcal{F}_y)$. $\mathcal{F}_x, \mathcal{F}_{xy}$ may be treated as image frames and warped them according to flow $\mathcal{F}^i$. Then, to align each frame $I_i$ to the reference according to the computed flows, $\hat{I}_i = \mathcal{W}_{\mathcal{F}_i^n}(I_i)$ may be computed. However, these computed flows may not differentiate bokehs from parallax and try to match the bokeh appearance to the reference.

To account for the bokeh effect, or the effect of bokeh expansion in the optical flow, bokehs must be identified or differentiated from the effects of parallax. Various assumptions may be used in order to identify bokeh regions. Example assumptions may include that bokeh regions generally have high color intensity. In addition, contour expansion of bokeh regions will have consistent movements through frames in the focal stack. For example, the expansion can either be outwardly only, inwardly only, or inward then outward, whereas movement due to parallax may appear more random. Bokeh regions may then be detected by measuring the size of areas expansion across the series of image frames. For example, a region of bright pixels that is initially small in one frame and constantly expands (or contracts) in other frames will correspond to a source of bokeh expansion.

Figure 6:
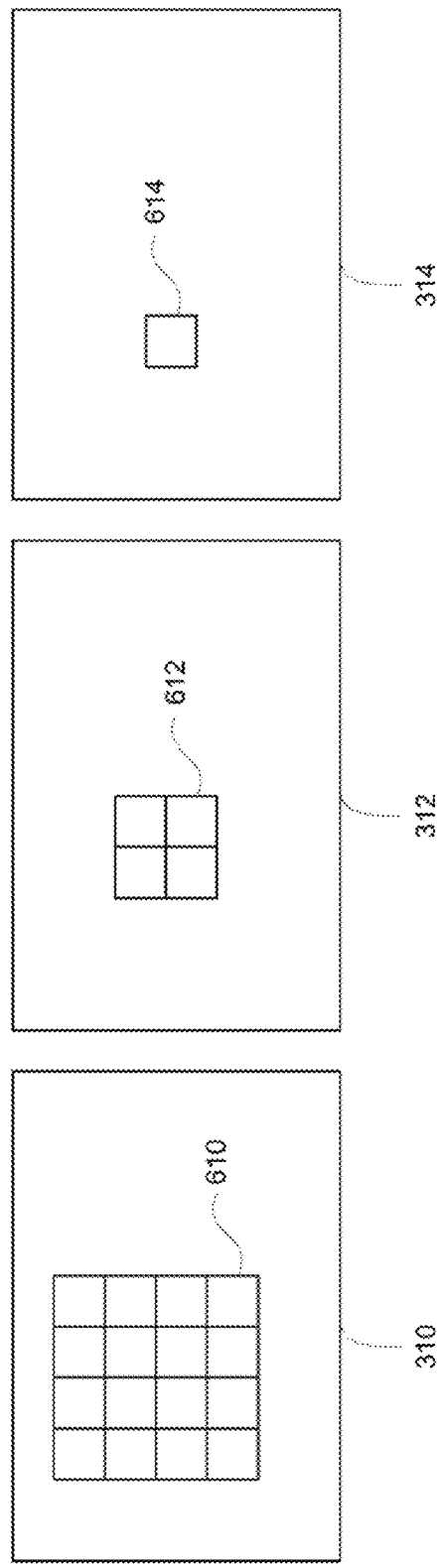
FIG. 6 is an example set of image frames in accordance with aspects of the disclosure.

FIG. 6 is an example of portions of image frames 310, 312, and 314 each including corresponding regions of bokeh effect 610, 612, 614, respectively. In this example, bokeh region 610 includes 16 pixels, bokeh region 612 includes 4 pixels, and bokeh region 614 includes 1 pixel. Thus between image frames 310 and 320, bokeh region 610 contracts by a factor of 2, and between image frames 312 and 314, bokeh region 620 contracts by a factor of 2. Thus, this is a simplified example for purposes of explanation. However, typically, these regions may expand and contract more randomly between image frames.

In order to approximate how much each pixel in each image frame expands, a voting scheme based on the determined flows may be used. FIGS. 7 through 13 are an example of a voting scheme for the pixels of bokeh regions 610, 620, and 630 of FIG. 6. As noted above, every pixel may vote for other corresponding pixels in other image frames. Thus, all of the pixels of image frame 310 will vote for pixels in each of images frames 312 and 314, all of the pixels of image frame 312 will vote for image frames 310 and 314, and so on until all pixels of all image frames have voted.

Figure 7:
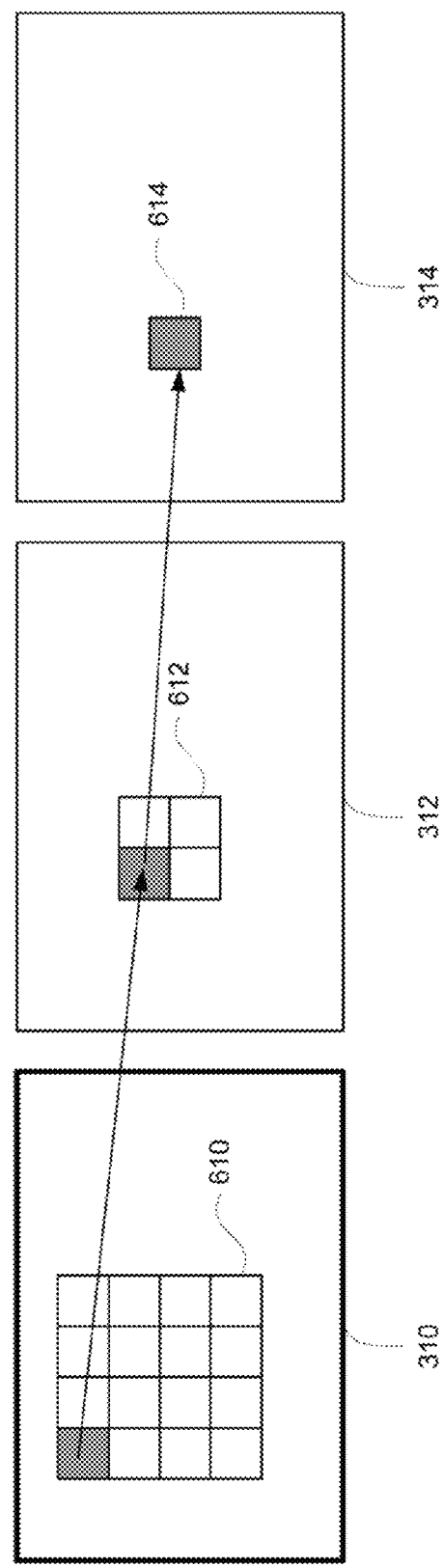
FIGS. 7-13 are an example of a voting scheme for the set of image frames of FIG. 6 in accordance with aspects of the disclosure.
Figure 8:
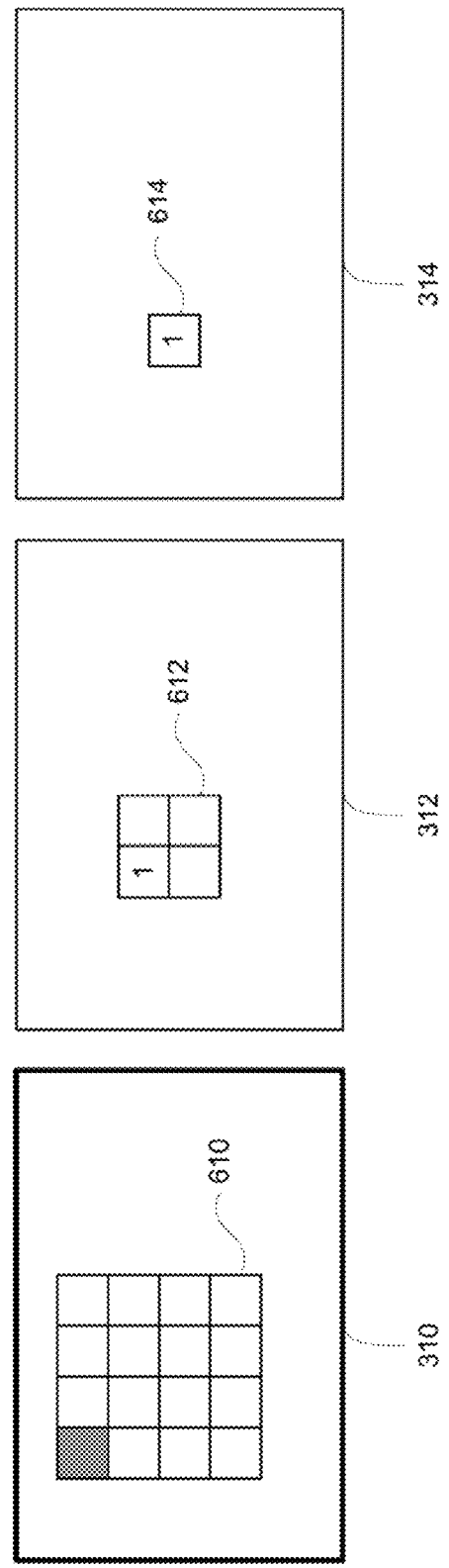
Figure 9:
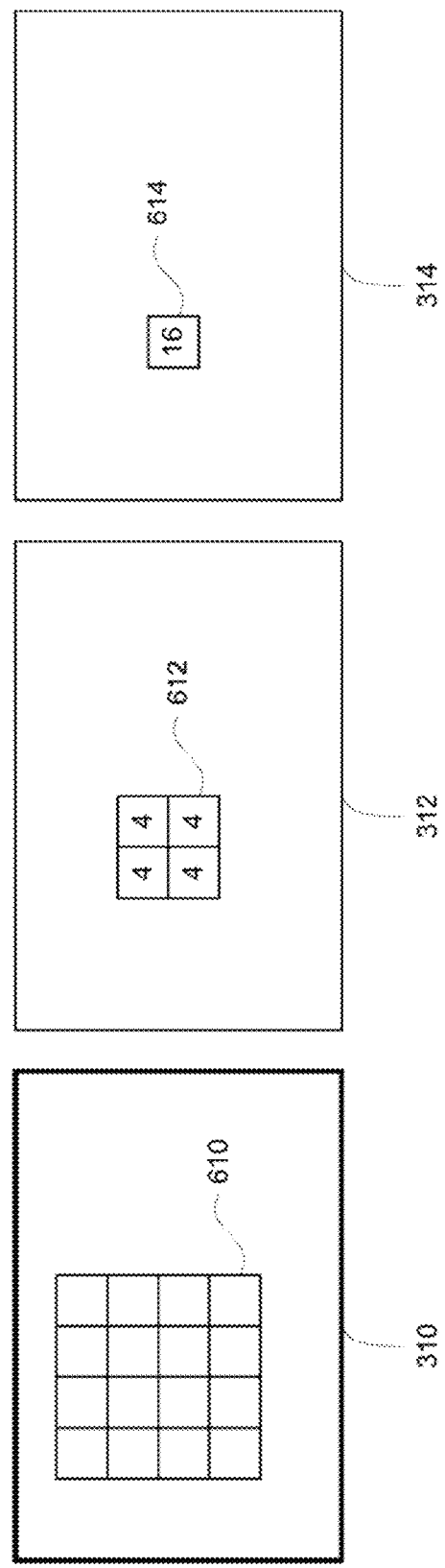

In FIG. 7, the voting begins with the pixels of image frame 310. Each particular pixel from the voting image frame will vote for the corresponding pixel in each other image frame to which that particular pixel flows. In the example of FIG. 7, the highlighted pixel of bokeh region 610 will flow into and therefore votes for each of the highlighted pixels of bokeh regions 620 and 630. Thus, each of the pixels highlighted in regions 610 and 620 of FIG. 7, are given 1 vote as shown in FIG. 8. Further, once each of the 16 pixels of image frame 310 have voted for image frame 320, there will be 16 votes for corresponding bokeh region 620 as shown in FIG. 9. Similarly, there will be 16 votes for corresponding bokeh region 630 of image frame 330.

Figure 10:
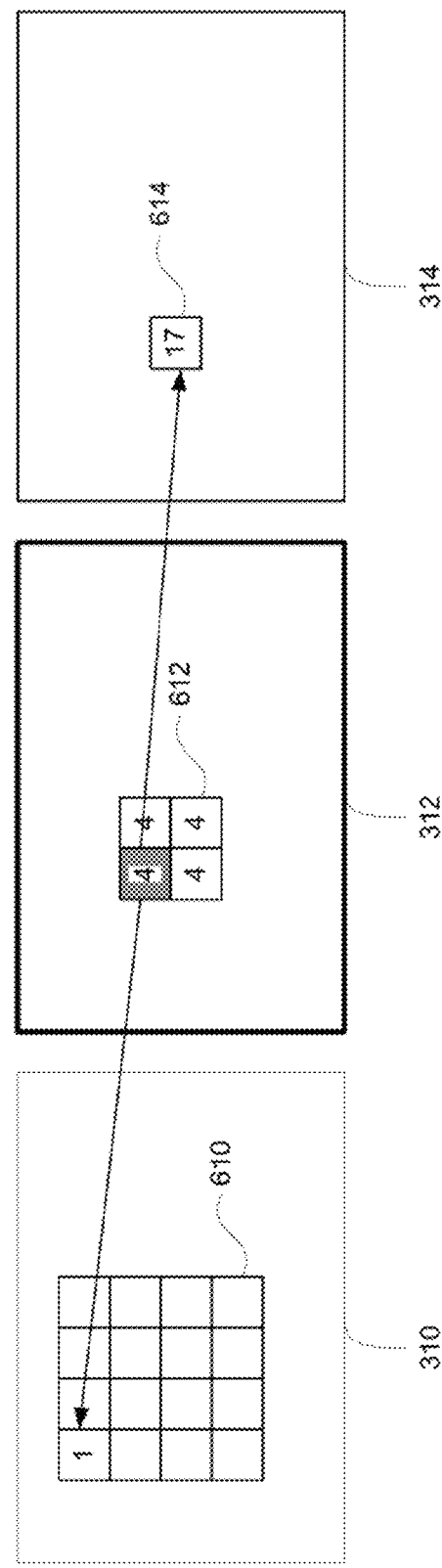
Figure 11:
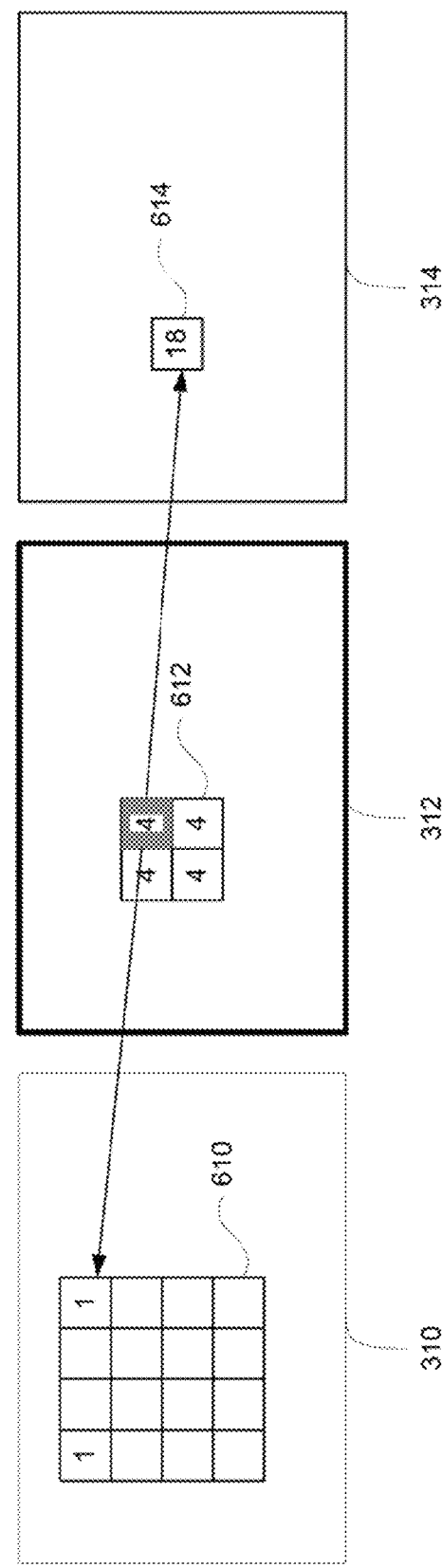
Figure 12:
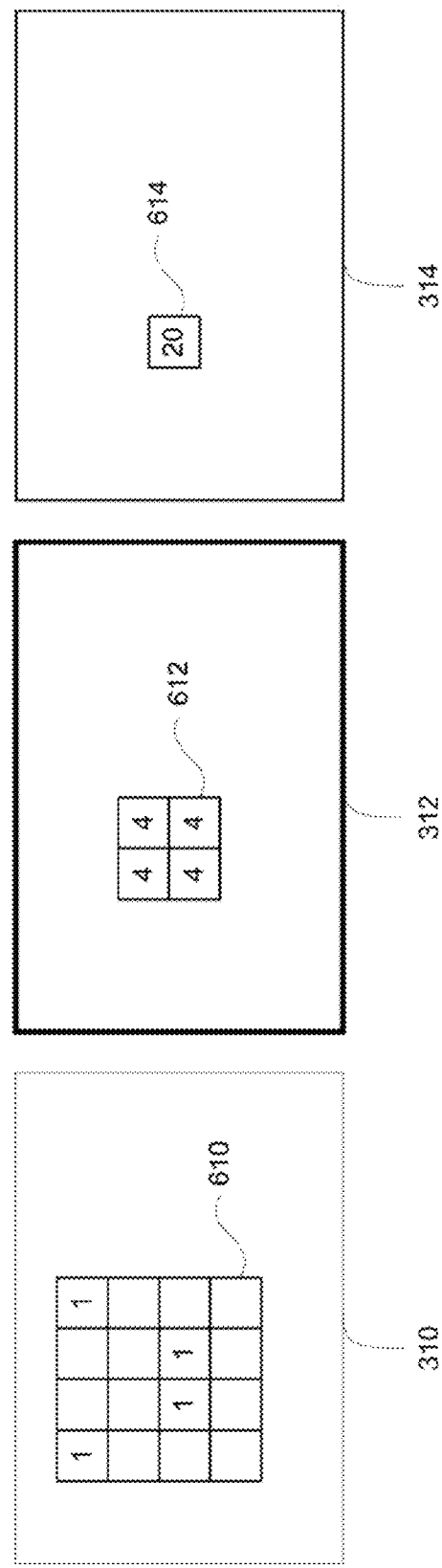
Figure 13:
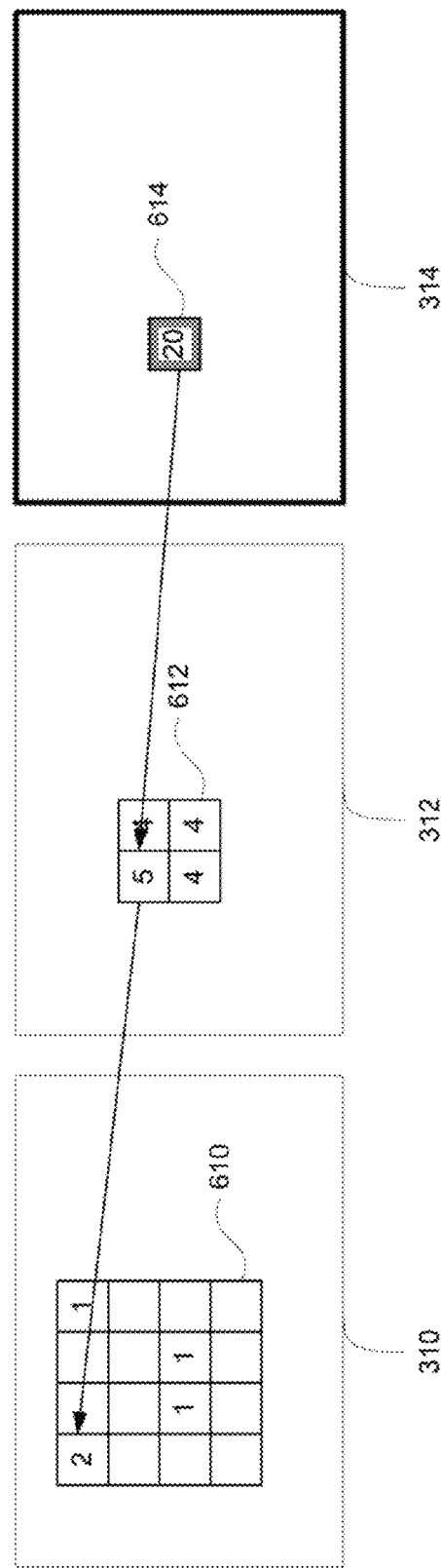

As shown in FIG. 10, once the votes of image frame 310 have been counted, votes of pixels from the next image frame, here image frame 320, may be counted. In this example, the highlighted pixel of bokeh region 620 votes for the corresponding pixel in each of bokeh regions 610 and 630. Thus, a pixel of bokeh region 610 is given 1 vote, and the pixel of bokeh region 620 is given 1 vote (16+1=17 votes). In FIG. 11, another pixel of bokeh region 620 is highlighted and votes for a pixel of bokeh regions 610 and 630. Once, the 4 pixels of image frame 320 have been voted, corresponding bokeh regions 610 and 630 will each have 4 additional votes as shown in FIG. 12.

Again, once the votes of image frame 320 have been counted, votes of pixels from the next image frame, here image frame 330, may be counted. Thus, in FIG. 13, the single pixel of bokeh regions 630 votes for a pixel of bokeh regions 610 and 620.

Pixels with high vote counts will correspond to the source of bokeh expansion because they will receive votes from larger corresponding regions from all other frames. Thus, in the example of FIG. 13, bokeh region 630 having 20 votes may correspond to a source of bokeh expansion.

Figure 14:
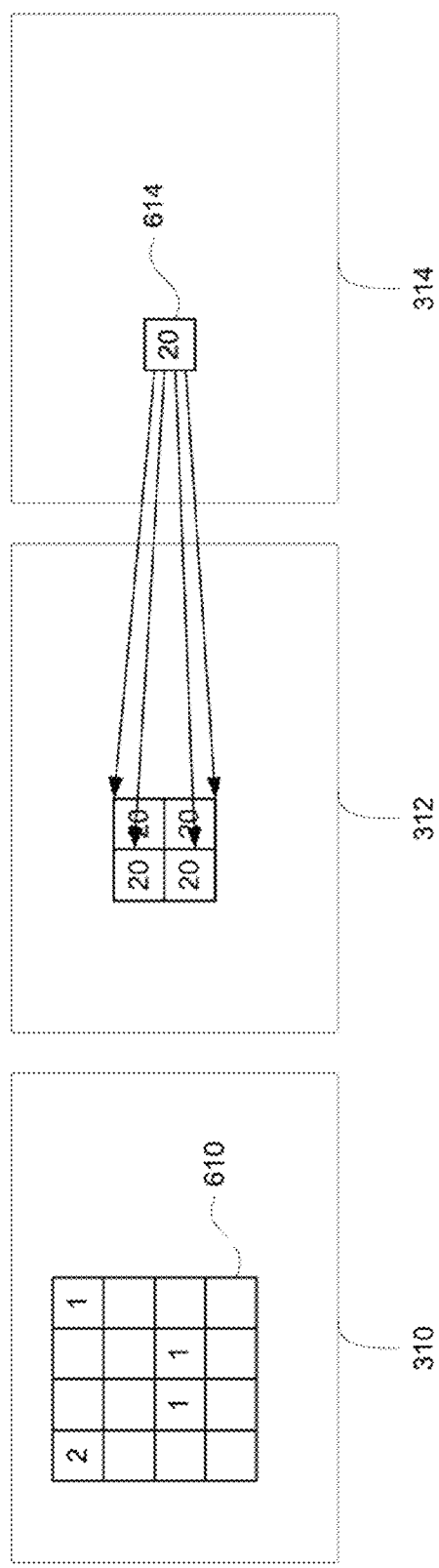
FIGS. 14 and 15 are an example of back propagation of voting values in accordance with aspects of the disclosure.
Figure 15:
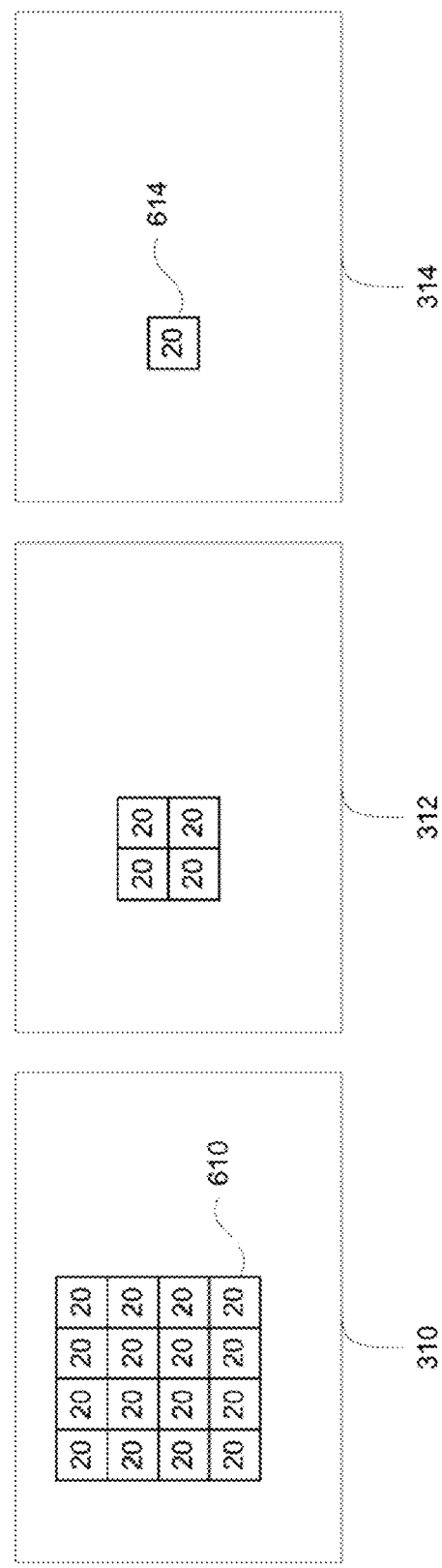

The highest votes for each region may be propagated back to the corresponding pixels for that region in the other image frames. Returning to the example of FIG. 13, bokeh region 630 has the highest number of votes. Thus, the votes for bokeh region 630 may be propagated to the pixels of corresponding bokeh region 620 of image frame 320 as shown in FIG. 14. Next, the votes for pixels of corresponding bokeh region 620 may be propagated to the pixels of corresponding bokeh region 610 of image frame 310 as shown in FIG. 15.

Figure 16:
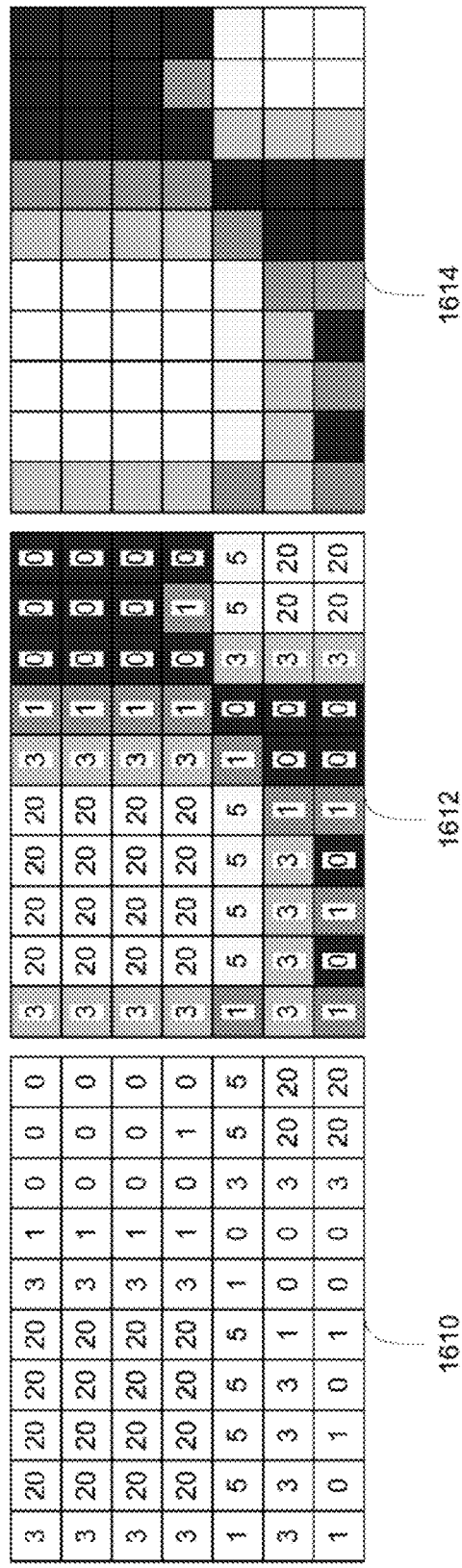
FIG. 16 is examples of bokeh confidence maps in accordance with aspects of the disclosure.

The propagated numbers of votes may be used to generate a bokeh confidence map. For example, as shown in FIG. 16, image frame 1610 is an example of a bokeh confidence map or an image frame having propagated numbers of votes. The pixels having the highest numbers of votes may correspond to bokeh regions. In this example, the numbers may be assigned a shading value such that high bokeh regions will appear brighter as in confidence map 1612. Confidence map 1614 is an example without the numbers of votes for each pixel. Again, the bright or white regions in this example may corresponding to regions of bokeh effect.

As another example, to find pixel correspondences in the set of image frames, a low-regularized optical flow process using the concatenation technique described above may be used to compute all-pair (warping one image to its pair) $\mathcal{F}_i^j$ for all i,j∈[n]. In order to do so, $p_i(u, v)$ be the pixel at (u, v) of image frame i. The pixel $p_i(u, v)$ will vote for corresponded pixel $p_i(u + \mathcal{F}_j^i(u, v)_x, v + \mathcal{F}_j^i(u, v)_y)$ for all j≠i. However, since the flow field is floating point, the votes may spread across the center pixel and the contribution weighted by a Gaussian function. Defining values u' and v' as $u' = u + \mathcal{F}_j^i(u, v)_x$ and $v' = v + \mathcal{F}_j^i(u, v)_y$, the total vote for pixel $p_i(s, t)$ may be computed by:

$$V_j(s, t) = \frac{1}{n-1} \sum_{i \neq j} \sum_{u,v} \exp\left(-\frac{(u'-s)^2 + (v'-t)^2}{2\sigma^2}\right).$$

Each value $v_{j,j}$ and the color intensity in the aligned frames may be threshold to detect which pixels in which image frames are likely to be the sources of bokeh expansion. To detect pixels of bokeh regions in every frame, as described above, maximum votes may be propagated back to the corresponded pixels. A bokeh confidence map for each frame can be generated by: $\mathcal{B}_i(s, t) = \max_{i \neq j}(\mathcal{W}_{\mathcal{F}_j^i}(v_{j,j}))(s, t)$.

The detected bokeh regions may then be used to guide where the flows should appear smooth. As an example, the bokeh regions can be incorporated into the computed flows by locally increasing the regularization in neighboring pixels of the bokeh regions. This provides an improved alignment of the images. A "flow interpolation" may be performed as a post-processing step which makes adjusting for the bokeh regions independent of the underlying optical flow process used. As an example, for each $\mathcal{F}_i^n$, areas with high $\mathcal{B}_i$, denoted by $\Omega$ with boundary $\partial\Omega$, may be masked out. The missing flow field values may be interpolated by minimizing: $\min_{\mathcal{F}'_x, \mathcal{F}'_y} \iint_\Omega |\nabla \mathcal{F}'_x|^2 + |\nabla \mathcal{F}'_y|$, such that $\mathcal{F}'_x|_{\partial\Omega} = \mathcal{F}_x|_{\partial\Omega}$ and $\mathcal{F}'_y|_{\partial\Omega} = \mathcal{F}_y|_{\partial\Omega}$. This can be converted into a linear leas-square problem on discrete pixels by computing gradients of pixels using finite difference. The boundary condition can also be encoded as least square terms in the optimization which can be solved efficiently.

Once the image frames are aligned, a pixel map may be created by using an operator that looks for gradients, edges, etc. An example would be an operator that measures the magnitude of image gradient such as $$\sqrt{\left(\frac{dI}{dx}\right)^2 + \left(\frac{dI}{dy}\right)^2}.$$

Figure 17:
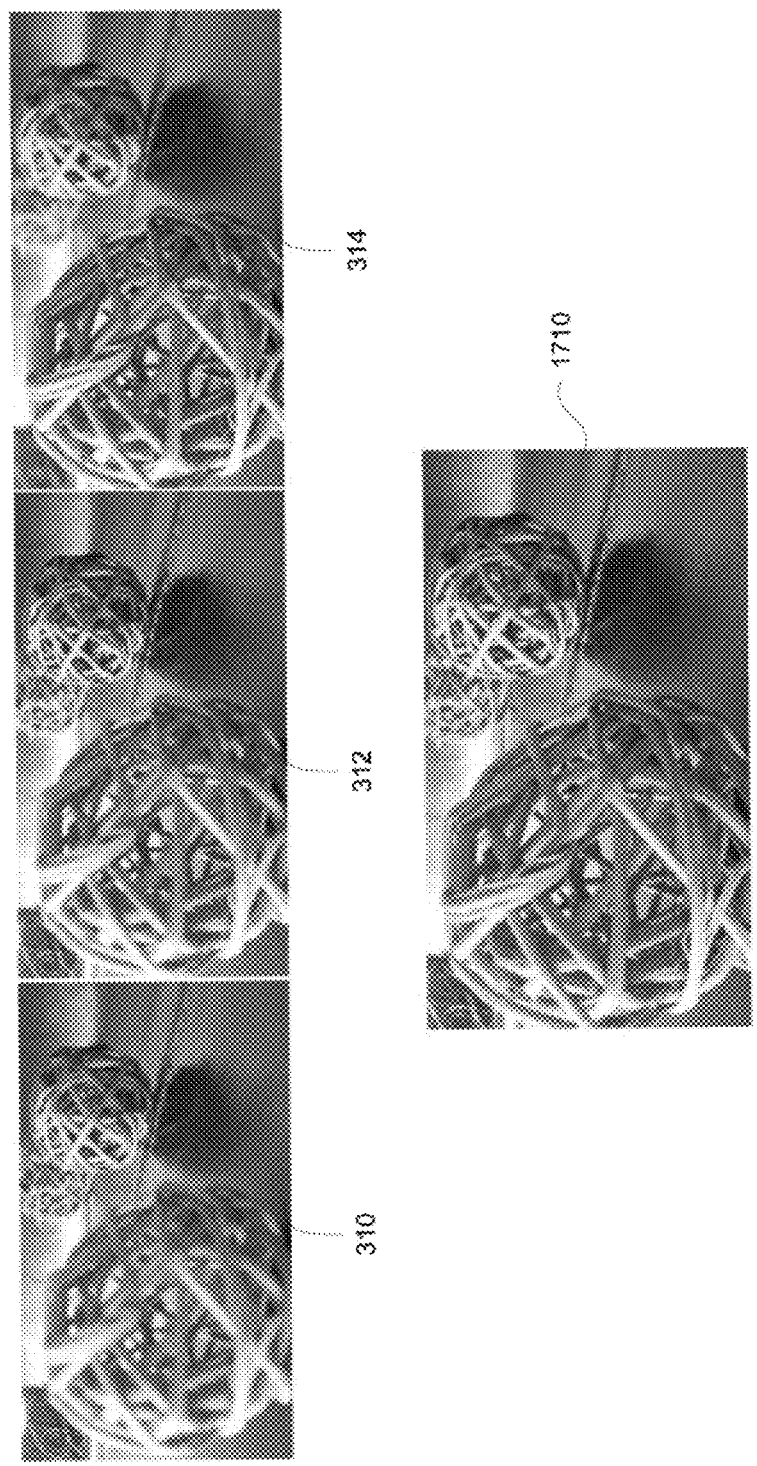
FIG. 17 is an example of a composite image of the most in-focus pixels for the set of image frames of FIG. 3 in accordance with aspects of the disclosure.

In this regard, a discrete Sobel operator may be used by finding values of $G_1$ and $G_y$, which are the gradient in the x and y directions, respectively, and returning the value of $\sqrt{G_x^2 + G_y^2}$. The value of $\sqrt{G_x^2 + G_y^2}$ may measure the confidence of a particular pixel being an edge. The result is an index map of each pixel's focus value. The colors associated with the pixels with the highest focus values may then be used to generate an all in focus image, or rather a composite image of the most in focus image. FIG. 17 is an example of a composite image 1710 that may be generated using the most in focus pixels, or those with the greatest focus value, of image frames 310, 320, and 330.

As an example, given an aligned set of image frames, $\hat{I}_1$, $\hat{I}_2, \ldots, \hat{I}_n$, all-in-focus composite image may be produced by mosaicing in-focus pixels from each image frame. The label estimation problem may be formulated as a multi-label Markov Random Field (MRF) optimization problem on a regular 4-connected grid where the labels are indices to each image frame in the set of image frames. Given $v$ as the set of pixels and $\mathcal{E}$ as the set of edges connecting adjacent pixels, the energy $E(x)$ may be minimized, where $E(x) = \Sigma_{i \in v} E_i(x_i) + \lambda \Sigma_{(i,j) \in \mathcal{E}} E_{ij}(x_i, x_j)$ and $\lambda$ is a weight factor. The unary term $E_i(x_i)$ may measure the amount of defocus and be proportional to one minus the normalized sum of gradient magnitudes over a Gaussian patch around the center pixel, denoted by GAD. However, pixels on the bokeh boundary may appear sharp and have high gradient magnitude but are not necessarily in focus. A simple scheme may be used to penalize those areas by adding a color intensity term, $C_i(x_i)$, to the unary term so that the optimization prefers smaller bokehs. Thus, $$E_i(x_i = j) = \begin{cases} \alpha G_i + (1-\alpha) C_i x_i & \text{if } \mathcal{B}_i(s,t) > 0 \\ G_i x_i & \text{otherwise.} \end{cases}$$

The size of Gaussian patch may have a great affect the quality of the index map and all-in-focus image. The pairwise term, $E_{ij}(x_i, x_j)$ may be defined as the total variation in the frame indices $|x_i - x_j|$.

Figure 18:
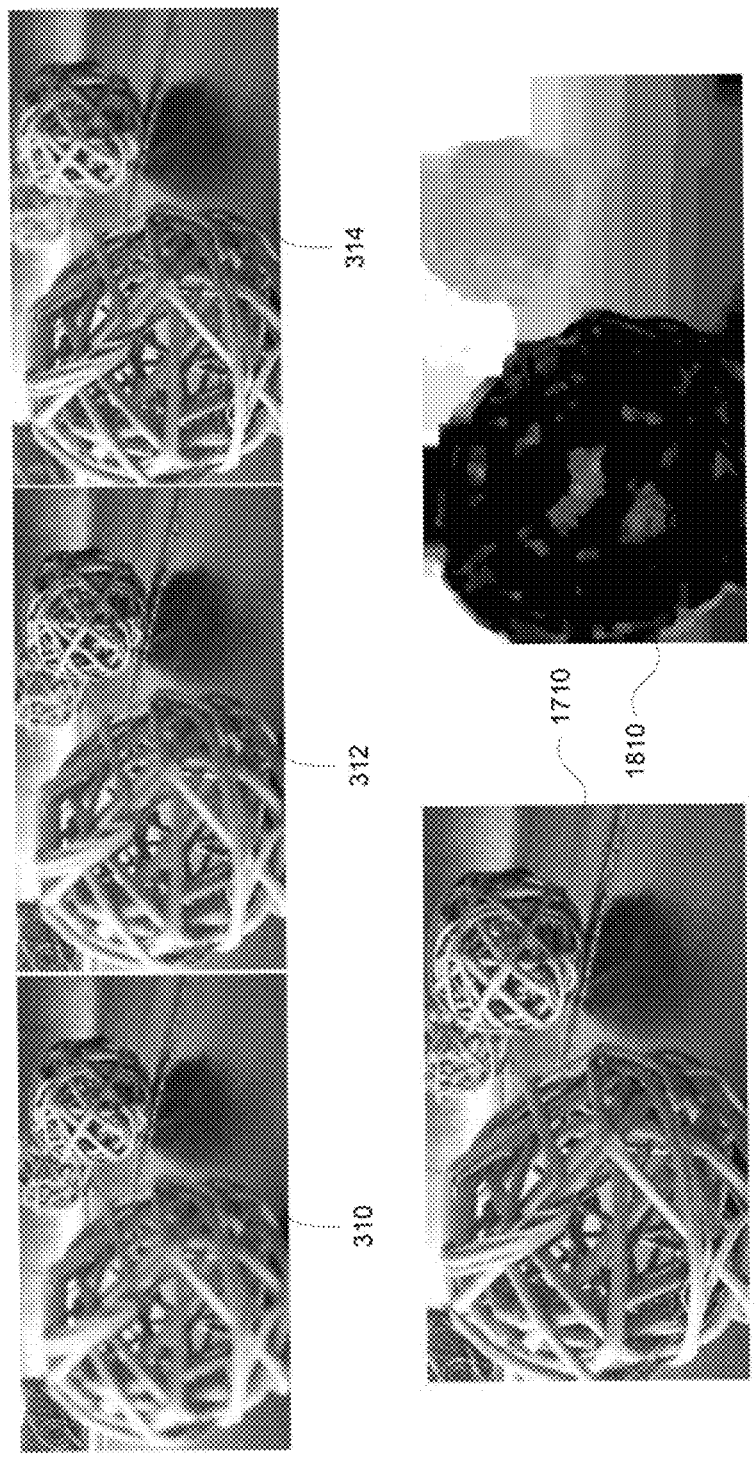
FIG. 18 is an example of a depth map generated based on at least the composite image of FIG. 17 in accordance with aspects of the disclosure.

The focal distance for each image frame and a depth map may be determined or generated using the aligned image frames as well as the all in focus image. This may be achieved by using a nonlinear optimization approach that simultaneously solves for both the focal distance and the depth map. For example, the pixels in an all-in-focus image may be blurred to simulate moving the focal plane. The blurred pixels may be compared to the pixels of each image frame to generate an estimate of the blur at each pixel and the location of the focal plane in that image frame. The result is the focal distance setting of the camera for each image frame as well as the depth of the pixels of each image. Image 1810 of FIG. 18 is an example depth map that may be generated using the composite image 1710.

Figure 19:
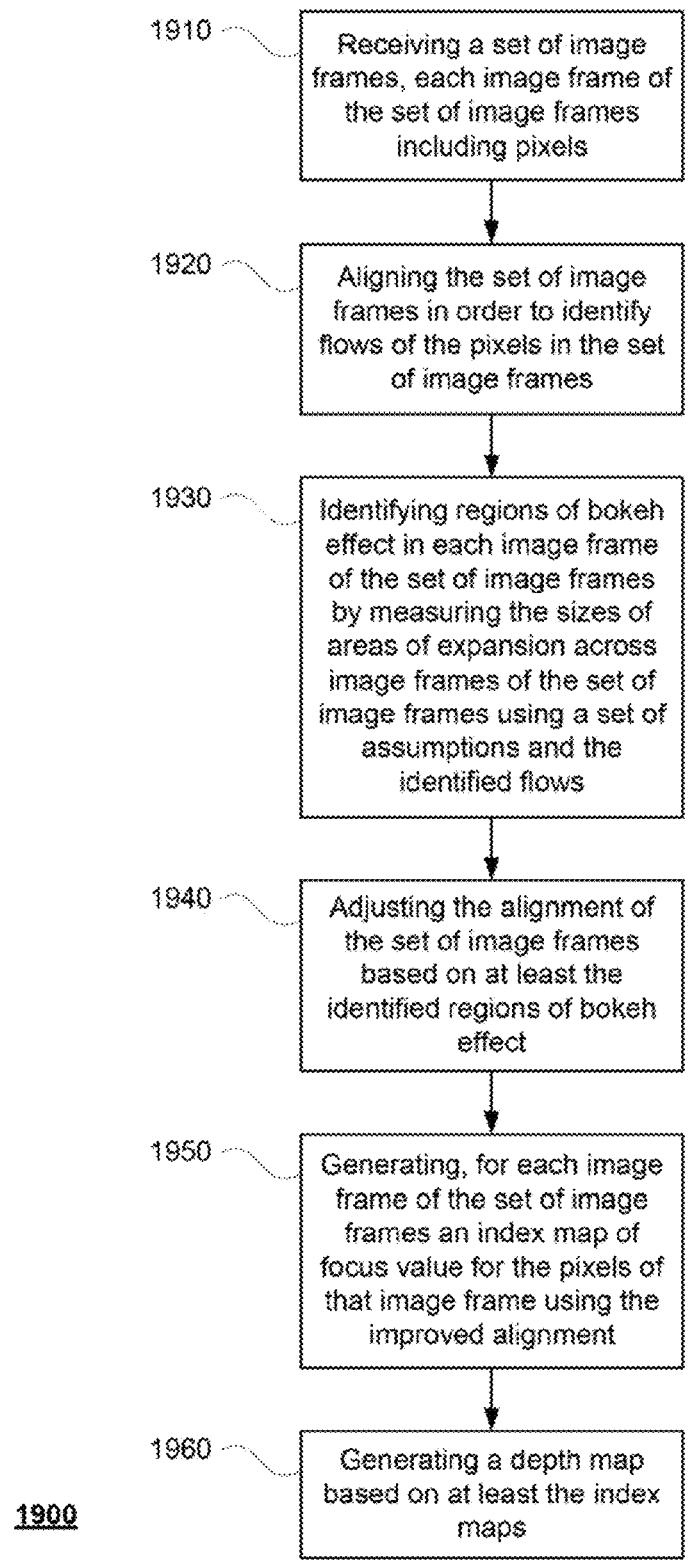
FIG. 19 is a flow diagram in accordance with aspects of the disclosure.

Flow diagram 1900 of FIG. 19 is an example of steps that may be performed by one or more computing devices, such as server computing devices 110 and/or client computing devices 120, 130, and 140, in accordance with aspects of the technology described herein. In this example, a set of image frames is received at block 1910. Each image frame of the set of image frames including pixels. The set of image frames is aligned in order to identify flows of the pixels in the set of image frames at block 1920. Regions of bokeh effect are identified in each image frame of the set of image frames by measuring the sizes of areas of expansion across image frames of the set of image frames using a set of assumptions and the identified flows at block 1930. The alignment of the set of image frames is adjusted based at least in part on the identified regions of bokeh effect at block 1940. For each image frame of the set of image frames an index map of focus values for each of the pixels each image frame using the improved alignment at block 1950. A depth map is generated based at least in part on the index maps at block 1960.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for generating depth maps, the method comprising:
   receiving, by one or more computing devices, a set of image frames, each image frame of the set of image frames including pixels;
   aligning, by the one or more computing devices, the set of image frames to provide flows of the pixels in the set of image frames;
   identifying, by the one or more computing devices, any region of bokeh effect in each image frame of the set of image frames by measuring sizes of areas of expansion across image frames of the set of image frames using an assumption that contour expansion due to a bokeh effect has consistent movements through frames of the set of frames and the flows;

adjusting, by the one or more computing devices, the alignment of the set of image frames based at least in part on the identified regions of bokeh effect;

generating, by the one or more computing devices, for each particular image frame of the set of image frames an index map of focus values for the pixels of that particular image frame using the improved alignment; and generating, by the one or more computing devices, a depth map based at least in part on the index maps.

2. The method of claim 1, further comprising capturing the set of image frames.

3. The method of claim 1, wherein aligning the set of image frames further includes using a flow concatenation process that determines optical flow between consecutive images.

4. The method of claim 3, wherein the flow concatenation process further produces new flows that warp each image frame of the set of image frames to a reference frame, and wherein the new flows are used to identify the regions of bokeh effect.

5. The method of claim 1, wherein identifying the regions of bokeh effect includes using a voting scheme that provides for each pixel in a first image frame of the set of image frames to vote for a corresponding pixel in each of the other image frames of the set of image frames.

6. The method of claim 1, wherein identifying any region of bokeh effect in each image frame of the set of image frames by measuring sizes of areas of expansion further includes using second assumption that a given region of bokeh effect has a high color intensity relative to other regions without bokeh effect.

7. The method of claim 1, further comprising generating a composite image of focused pixels from the set of image frames based at least in part on the index map, wherein the composite image is used to generate the depth map.

8. A system for generating depth maps, the system comprising one or more computing devices configured to:

receive a set of image frames, each image frame of the set of image frames including pixels;

align the set of image frames to provide flows of the pixels in the set of image frames;

identify any region of bokeh effect in each image frame of the set of image frames by measuring sizes of areas of expansion across image frames of the set of image frames using an assumption that contour expansion due to a bokeh effect has consistent movements through frames of the set of frames and the flows;

adjust the alignment of the set of image frames based at least in part on the identified regions of bokeh effect;

generate, for each particular image frame of the set of image frames an index map of focus values for the pixels of that particular image frame using the improved alignment; and generate a depth map based at least in part on the index maps.

9. The system of claim 8, wherein the one or more computing devices are further configured to capture the set of image frames.

10. The system of claim 8, wherein the one or more computing devices are further configured to align using a flow concatenation process that determines optical flow between consecutive images.

11. The system of claim 10, wherein the one or more computing devices are further configured to produces new flows that warp each image frame of the set of image frames to a reference frame and the one or more computing devices are further configured to use the new flows to identify the bokeh regions.

12. The system of claim 8, wherein the one or more computing devices are further configured to identify the regions of bokeh effect by using a voting scheme that provides for each pixel in a first image frame of the set of image frames to vote for a corresponding pixel in each of the other image frames of the set of image frames.

13. The system of claim 8, wherein the one or more computing devices are further configured to:

generate a composite image of focused pixels from the set of image frames based at least in part on the index map, and to use the composite image to generate the depth map.

14. A non-transitory, tangible computer-readable recording medium storing instructions, the instructions, when executed by one or more processors, cause the one or more processors to perform a method for generating depth maps, the method comprising:

receiving a set of image frames, each image frame of the set of image frames including pixels;

aligning the set of image frames to provide flows of the pixels in the set of image frames;

identifying any region of bokeh effect in each image frame of the set of image frames by measuring sizes of areas of expansion across image frames of the set of image frames using a an assumption that contour expansion due to a bokeh effect has consistent movements through frames of the set of frames and the flows;

adjusting the alignment of the set of image frames based at least in part on the identified regions of bokeh effect;

generating for each particular image frame of the set of image frames an index map of focus values for the pixels of that particular image frame using the improved alignment; and generating a depth map based at least in part on the index maps.

15. The medium of claim 14, wherein the method further includes capturing the set of image frames.

16. The medium of claim 14, wherein the method further includes aligning the set of image frames by using a flow concatenation process that determines optical flows between consecutive images.

17. The medium of claim 16, wherein the flow concatenation process further produces new flows that warp each of the image frames of the set of image frames to a reference frame and the method further includes using the new flows to identify the regions of bokeh effect.

18. The medium of claim 14, wherein the method further comprises identifying the regions of bokeh effect by using a voting scheme that provides for each pixel in a first image frame of the set of image frames to vote for a corresponding pixel in each of the other image frames of the set of image frames.

19. The medium of claim 14, wherein the method further comprises:

generating a composite image of focused pixels from the set of image frames based at least in part on the index map, wherein the composite image is used to generate the depth map.

* * * * *